LEAK TESTING METHOD AND APPARATUS

Original Filed June 16, 1964 6 Sheets-Sheet 1

INVENTORS
RICHARD T. FITZPATRICK
RAY MOORE, JR.
BY
Curtis, Morris & Safford
ATTORNEYS

LEAK TESTING METHOD AND APPARATUS

Original Filed June 16, 1964 6 Sheets-Sheet 2

INVENTORS.
RICHARD T. FITZPATRICK
RAY MOORE, JR.
BY
Curtis, Morris & Safford
ATTORNEYS

LEAK TESTING METHOD AND APPARATUS

Original Filed June 16, 1964 6 Sheets-Sheet 3

INVENTORS
RICHARD T. FITZPATRICK
RAY MOORE, JR.
BY
Curtis, Morris & Safford
ATTORNEYS

LEAK TESTING METHOD AND APPARATUS

Original Filed June 16, 1964 6 Sheets-Sheet 4

INVENTORS
RICHARD T. FITZPATRICK
RAY MOORE, JR.
BY
Curtis, Morris & Safford
ATTORNEYS INVENTORS
RICHARD T. FITZPATRICK
RAY MOORE, JR.
BY
Curtis, Morris & Safford
ATTORNEYS

LEAK TESTING METHOD AND APPARATUS

Original Filed June 16, 1964 6 Sheets-Sheet 6

INVENTORS
RICHARD T. FITZPATRICK
RAY MOORE JR.

Curtis, Morris & Safford
ATTORNEYS

United States Patent Office

Re. 26,657
Reissued Sept. 9, 1969

26,657

LEAK TESTING METHOD AND APPARATUS

Richard Thomas Fitzpatrick and Ray Moore, Jr., by Ajem Laboratories, Inc., assignee, Livonia, Mich., a corporation of Michigan Original No. 3,314,283, dated Apr. 18, 1967, Ser. No. 375,515, June 16, 1964. Application for reissue Feb. 23, 1968, Ser. No. 710,437

Int. Cl. G01m *3/04*

U.S. Cl. 73—40 20 Claims

Matter enclosed in heavy brackets [ ] appears in the original patent but forms no part of this reissue specification; matter printed in italics indicates the additions made by reissue.

The present invention relates to leak testing and more particularly to an improved method of and apparatus for testing parts having internal cavities.

It is essential that the parts of a commercial product, such as an automobile, be tested for leaks before the parts are assembled because of the cost involved in returning the product and disassembling the part and because of the bad reputation which often results from placing a product on the market that is initially defective. To avoid these difficulties it has become the practice to test the parts for leaks. One of the more common early methods of testing for leaks was to paint the exterior of the part with soapy water and subject the interior to pressure to form soap bubbles at any place where a leak exists. Another method commonly used was to immerse the part in water while subjected to an internal air pressure and observe bubbles of air that flow through leaks. Still another method was to subject the internal cavity of the part to hydraulic pressure and observe the oozing of liquid if any leak exists. A more recent method is to measure any small differences in the pressure between fluid in a cavity in the part to be tested and a sample of the same fluid trapped in a closed cell and amplifying the difference in pressure by a mechanical motion multiplying mechanism.

All of these methods are useful in detecting leaks in parts having cavities to which pressure may be supplied, but each has definite limitations. Certain of the methods are slow and cumbersome and are apt to subject the part to excessive corrosion. Certain of the methods are not sufficiently sensitive to detect small leaks and others are slow in responding to leaks. Also, certain of the methods may not be reliable in detecting leaks and may be influenced by environment or inherent characteristics such as temperature differences and different seasons of the year. Any one particular method may have one or more of the above described faults or may include all of the faults.

One of the objects of the present invention is to provide an improved method of and apparatus for testing parts for leaks which avoids the deficiencies of prior testing methods and apparatus.

Another object is to provide a method of and apparatus for testing parts which is extremely sensitive in detecting leaks and responds rapidly to indicate that a leak exists.

Another object is to provide an improved method of and apparatus for testing parts for leaks which operates at high speed to indicate whether or not a leak exists, and its degree, with a high degree of reliability.

Another object is to provide an apparatus for testing parts for leaks having a minimum of mechanically moving parts such as relays and valves.

Still another object is to provide an apparatus of the type indicated which is of simple and compact construction, economical to manufacture, and one which is easy to service and repair.

These and other objects will become more apparent from the following descriptions and drawings in which like reference characters denote like parts throughout the several views. It is to be expressly understood, however, that the drawings are for the purpose of illustration only and are not a definition of the limits of the invention, reference being had for this purpose to the appended claims.

Figure 1:
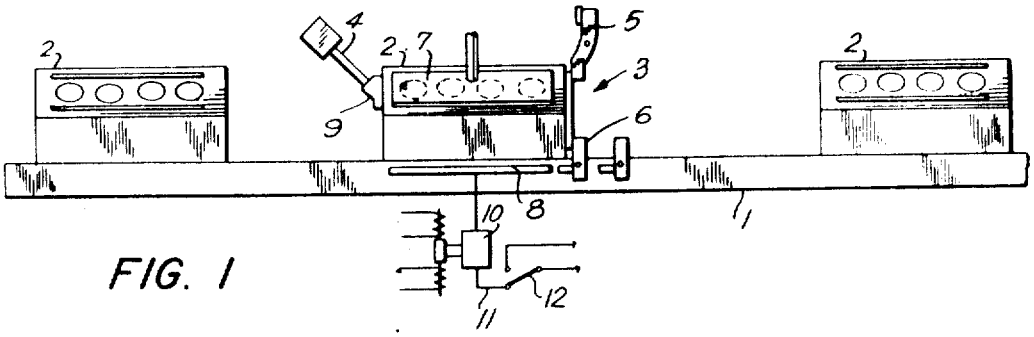
FIGURE 1 is a diagrammatic view of a conveyor in a production line testing apparatus and showing the manner of clamping the parts and sealing the cavities therein for a testing operation and the control switch for initiating a testing operation.

Preliminary to testing a part for leaks, such as the automobile engine block illustrated, the part is delivered to a testing station where the various leak testing operations are performed. The part is then clamped in a fixed position, the openings in the block sealed and the interior of the block is filled with a fluid at a predetermined pressure such as, for example, air at 35 p.s.i. The pressure at the interior of the engine block is transmitted to one side of a diaphragm in a pressure differential measuring device and the opposite side of the diaphragm is subjected to a predetermined fixed pressure. Any difference in pressure during a predetermined period of time, for example, 5 seconds, flexes the diaphragm which indicates that a leak exists. No difference in pressure, on the other hand, indicates that there is no substantial leak in the part.

In accordance with the present invention the flexing of the diaphragm is used to produce an electric voltage which varies directly in proportion to the degree of flexing of the diaphragm. This voltage resulting from a difference in pressure is converted to an electrical signal to operate a read out device such as the movable needle of a meter which visually indicates a particular difference in pressure and thereby the size of a leak which may be observed by an operator. Thus, if the deflection of the diaphragm remains within predetermined limits for a required period of time, the part has substantially no leaks and may be accepted. If, on the other hand, a difference in pressure deflects the diaphragm in one direction indicating a leak or in the opposite direction indicating a malfunction of the testing apparatus, the part is rejected for reworking or scrap.

To avoid the human error inherent in visual observation, the meter operates through an optical system to actuate a relay. The optical system directs separate beams of light toward spaced photoelectric cells in a path traversed by the indicating needle of the meter. Thus, when the needle of the meter swings to an angle to interrupt one of the beams of light to its photoelectric cell a relay is de-energized to indicate that the part has a leak. The relay may be used to visually indicate that the part is rejected or may operate mechanism to actuate a rejecting device, or stamp the part and remove it from a production line.

The method of the present invention also includes the step of providing a ballast chamber tor containing fluid under pressure which may be repeatedly used in the opposite sides of the differential diaphragm and subjected only to the pressure of the fluid supplied to the part being tested. This chamber and passages to and from the chamber and parts to be controlled are all contained in a metal manifold block. The step of providing passageways and a ballast chamber for testing fluid in a single manifold block eliminates errors occurring due to temperature differences, reduces the length of the lines between parts and hysteresis in the testing apparatus and reduces the time required to stabilize before a reading can be made as well as providing a more compact and efficient testing unit. Any differences in temperature between the fluid in the different passageways is quickly equalized by conduction in the metal block and the relatively short lines between the parts reduces to a minimum the amount of heat transmitted into the testing system.

The method of the present invention for producing improved sensitivity and responsiveness as well as reliability in operation includes the steps of automatically controlling the successive steps of a testing operation, one after the other, at the proper time interval. This phase of the improved method comprises the steps of sequentially energizing successive branch circuits, each of which has an electric time period in accordance with its RC network, to control the time at which each step occurs. Also, the control circuit closes the valves of the pneumatic control system after each indexing step. To reduce the number of moving parts, these control functions are performed by silicon control rectifiers and protective silicon diodes. Silicon control rectifiers have three terminals comprising an anode, a cathode and a gate. In one condition no current flows from the anode to the cathode, but when a pulse of electric current is applied to the gate it makes the device conductive, known as firing, so that current then flows from the anode to the cathode and continues to flow after the pulse is removed from the gate. A silicon diode is like a one way valve which permits electric current to flow in one direction and prevents flow in the opposite direction. Thus, in accordance with the method of the present invention current is caused to flow through the various solenoids of the control valves when subjected to an electric impulse and the impulses are controlled by the electric time periods of the RC network of different branch circuits successively energized to automatically perform the entire testing operation.

Referring now to the drawings, an apparatus is illustrated for performing the steps of the method. In the drawings, FIGURE 1 illustrates a conveyor 1 for intermittently advancing parts 2 to a station 3 where they are to be tested for leaks. In the illustrated embodiment the parts 2 are shown in the form of automobile engine blocks having internal cavities in the form of cylinders and valve ports. At the station 3 the engine block 2 is stopped by a ram 4 which engages the front end of the block and clamps it against dogs 5 and 6 at the rearward end of the block. Closures 7 and 8 cover and seal openings, such as the valve ports and crank case openings in the block, and the ram 4 has a seal 9 which also closes the opening in the front end of the block for connection to a water pump (not shown). Closure 8 is shown diagrammatically as operated by an electromagnet 10 and having an extension 11 for operating a switch 12 to initiate a testing operation. While not shown, it will be understood that ram 4 and closures 7 and 8 are operated automatically in sequential order and that closure 8 will be the last to be actuated so that all of the openings will be closed and sealed before a test is initiated.

Figure 2:
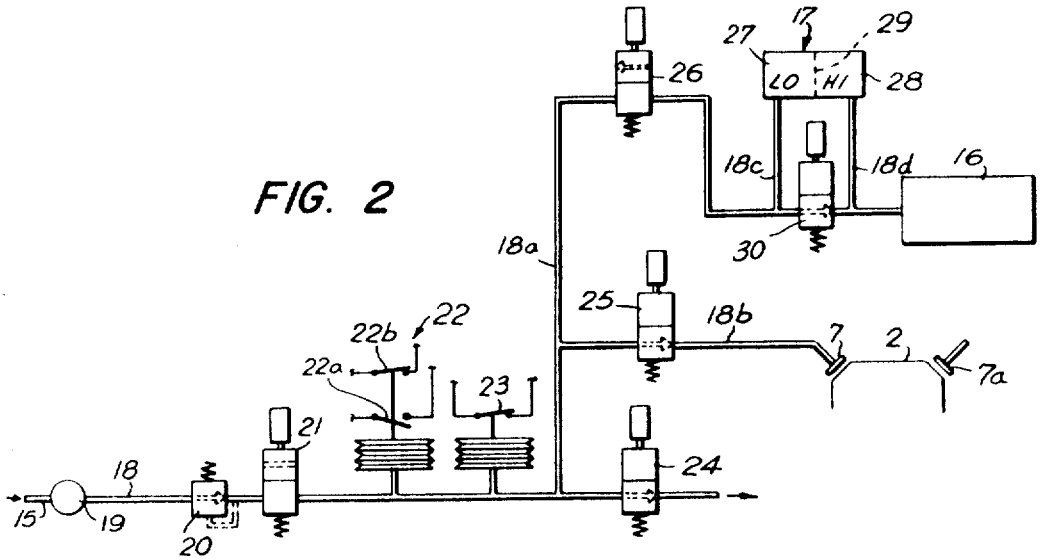
FIGURE 2 is a diagrammatic view of a pneumatic testing circuit showing the manner of connecting the cavity in a part to be tested for comparison with a trapped sample of testing fluid at fixed pressure to indicate a difference in pressure when a leak occurs.

The testing apparatus is illustrated diagrammatically in FIGURE 2 as comprising a fluid pressure system having a source of fluid 15 at high pressure, for example, air at 120 pounds per square inch. A conduit 18 from the fluid source 15 has branches connected to the part 2 being tested, a ballast tank 16, and a differential pressure measuring instrument 17. Air from source 15 flows in conduit 18 through a filter 19 and pressure regulator 20 for reducing the pressure from 120 pounds per square inch to 45 pounds per square inch. Beyond the pressure regulator 20 in the conduit line 18 is a normally-closed rapid-fill solenoid operated valve 21, high and low pressure switches 22 and 23 and a normally-open solenoid operated dump valve 24 connecting the conduit line 18 to atmosphere. High pressure switch 22 is a double pole switch having one normally-open contact 22a which closes at 45 p.s.i. and one normally-closed contact 22b which opens at 35 pounds per square inch. Low pressure switch 23 is normally open above 35 pounds per square inch and closed at 35 pounds per square inch and below. Between the low pressure switch 23 and dump valve 24 conduit 18 has a branch 18a connected to the measuring instrument 17 and ballast tank 16. A branch 18b from 18a is connected to one of the closures 7 to supply air under pressure to the cavity in the engine block and the opposite side of the engine block is sealed by a closure 7a. A normally-open solenoid-operated circuit test valve 25 is provided in branch line 18b. Branch line 18a has a normally-closed solenoid-operated valve 26 therein to isolate the ballast cavity 16 and measuring instrument 17 from the remainder of the circuit except when a test is being performed. Branch conduit 18a is connected to the chambers 27 and 28 at opposite sides of a diaphragm 29, see FIGURES 2 and 3, by conduits 18c and 18d and to the ballast tank 16. A normally-open solenoid-operated divide valve 30 is positioned in conduit 18a between conduits 18c and 18d connected to chambers 27 and 28 of the measuring instrument 17. Divide valve 30, when closed, connects the high pressure chamber 28 of measuring instrument 17 to the ballast cavity 16 and segregates it from the low pressure chamber 27 connected to the engine block 2 through valves 25 and 26 when open.

To perform a leak test, dump valve 24 is closed, the rapid fill valve 21 is opened to supply air at 45 pounds per square inch pressure through the conduit line 18 and branch line 18b through the normally open valve 25 to the cavity in the engine block 2. When a pressure of 45 pounds per square inch occurs in the conduit 18, the high pressure switch 22 closes and operating through a control circuit, later to be described, initiates the next step in the testing operation and closes the rapid fill valve 21. Dump valve 24 then opens to bleed the line to the atmosphere until a low pressure of 35 pounds per square inch is attained at which time the low pressure switch 23 closes dump valve 24 and traps air at that pressure in the interior of the part to be tested. After a period of time, as measured electrically to permit the pressure to stabilize, the isolate valve 26 opens to connect the ballast tank 16 and chambers 27 and 28 of the differential pressure measuring instrument 17 to the cavity in the part 2 being tested. After another period of time to permit the whole system to stabilize, the divide valve 30 closes to connect the ballast tank 16 to the high pressure chamber 28 and connect the low pressure chamber 27 to the interior of the engine block 2 being tested. The divide valve 30 is maintained closed for a predetermined period of, for example, 5 seconds, during which time any leak from the engine block 2 will produce a differential in pressure in the measuring instrument 17 and a deflection of the diaphragm 29 to the left as viewed in FIGURE 2.

Figure 3:
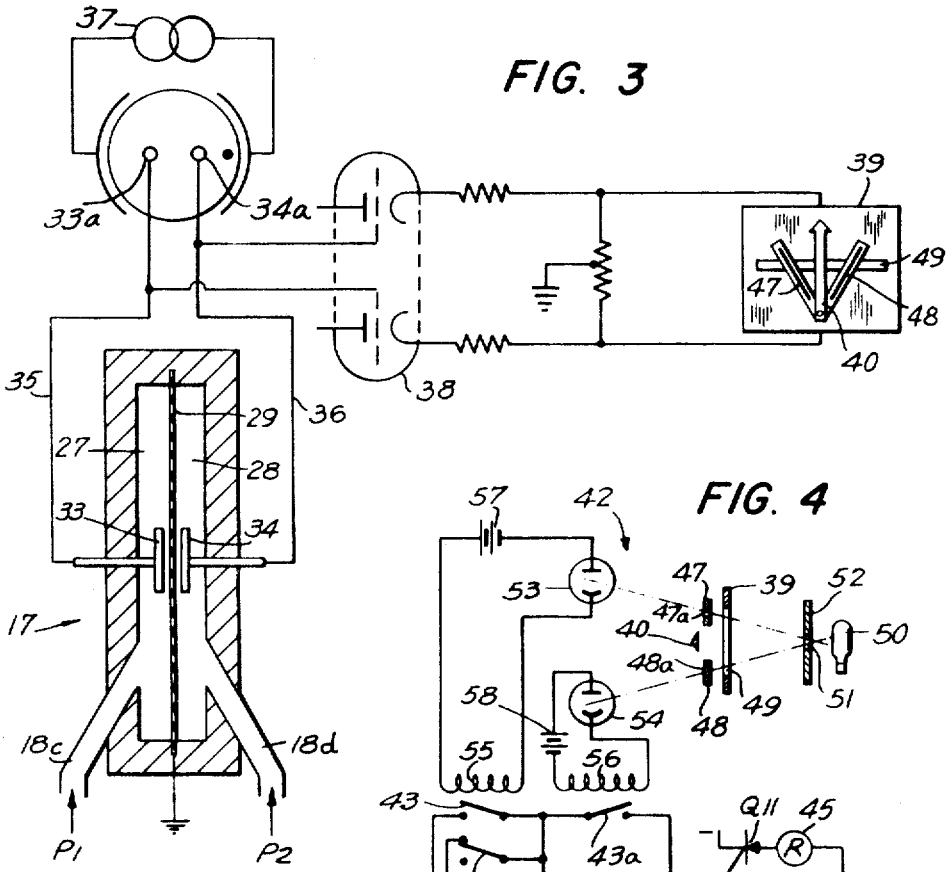
FIGURE 3 is a diagrammatic view of a sensing instrument for producing a variation in electric current directly proportional to a difference in pressure.

The differential pressure measuring instrument 17 is shown more in detail in FIGURE 3 as having the low pressure chamber 27 at one side and the high pressure chamber 28 at the other side of the diaphragm 29. At the opposite sides of the diaphragm 29 are electrode plates 33 and 34 mounted on stems in the side walls of the chambers and connected by electric lines 35 and 36 to *electrodes 33a and 34a in an envelope containing a gas ionized by* an oscillating generator 37 [in the form of a vacuum tube] for producing a 50,000 cycle alternating current. The generator 37 ionizes the *gas between the electrodes 33a and 34a and the* space between the plates 33 and 34 and *diaphragm 28 constitute capacitors and* when the diaphragm is centrally positioned between the plates the latter are equally charged. However, if the diaphragm is flexed in either direction an alternating current difference will exist between the electrodes with a difference in migration of electrons in the ionized gas between the [diaphragm and] electrodes give rise to a direct current voltage *as described in the United States Letters Patent to K. S. Lion et al. Nos. 2,696,566 and 2,696,584 issued Dec. 7, 1954, and entitled "Electric Transducer System" and "Electric Circuit" respectively,* which is directly proportional to the degree of displacement of the diaphragm 29 which, in turn, is directly proportional to the difference in pressure in the chambers 27 and 28. Thus, the measuring instrument 17 constitutes a transducer which converts mechanical movement to an electric potential. The change in potential, due to deflection of the diaphragm 29, is converted into current by the cathode follower 38 which, in turn, is connected to an indicator illustrated herein as a meter 39 for indicating the difference in pressure and thereby the size of the leak. If, during a test, the needle 40 of the meter remains on zero for the period of the test, it shows that there is no substantial leak in the part being tested. If the needle 40 of the meter 39 turns to the left it indicates a leak in the part 2 and the size of the leak can be observed by the degree of displacement of the needle. If the needle 40 on the other hand, moves to the right, it would indicate a malfunction of the testing apparatus.

Figure 4:
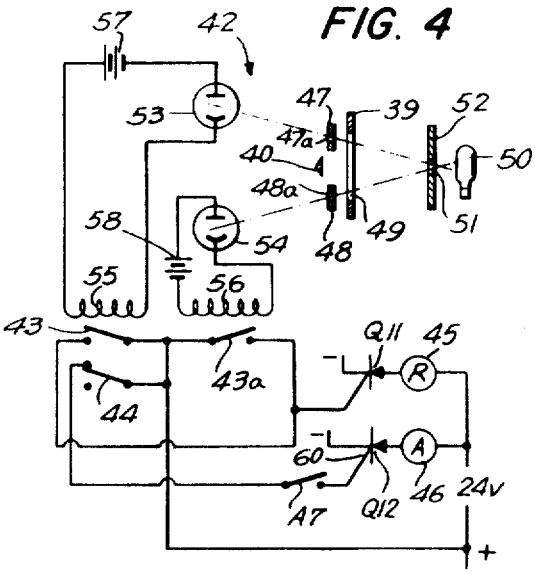
FIGURE 4 is a diagrammatic view of an optical system used in conjunction with the sensing instrument for automatically actuating responsive mechanism.
Figure 5:
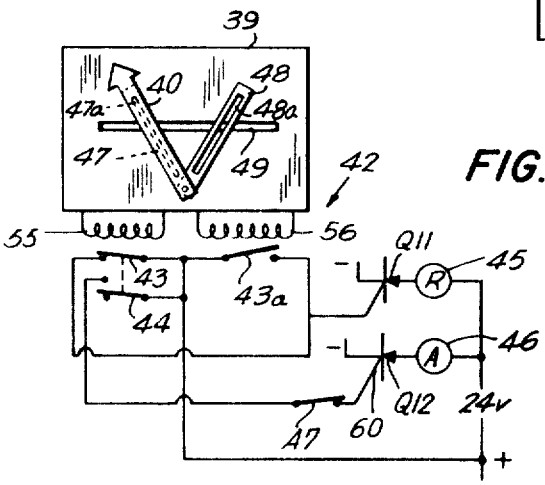
FIGURE 5 is a front elevational view of the indicating meter illustrated in FIGURE 3 and shown in position to initiate operation of a responsive device shown in FIGURE 4.

The meter 39 of the measuring instrument 17 in addition to visually indicating a leak and the size of the leak, also operates through an optical control instrument 42, illustrated in FIGURES 4 and 5, to control relays 43 or 44 to reject or accept a part being tested. These relays 43 and 44 may operate mechanisms to retain the engine block 2 on the conveyor 1, illustrated in FIGURE 1, if accepted and remove the block from the conveyor if rejected, or the relays may operate to mark the engine block for rework. In the illustrated embodiment the relays 43 and 44 are shown connected to turn on indicating lamps 45 and 46, but it will be understood that they also may be used to automatically control the disposition of the tested engine block as described.

The optical control 42 illustrated in FIGURES 3 to 5 comprises angularly related arms 47 and 48 on the face of the meter 39 which are adjustable about the axis of the meter needle 40 to different angular positions with respect to a central zero point on the meter dial. While the arms 47 and 48 may have other constructions they are shown in the illustrated embodiment as provided with slots 47a and 48a extending longitudinally thereof and overlying a horizontal slot 49 in the dial of the meter 39. Beams of light, see FIGURE 4, such as produced by an electric lamp 50, are directed through an aperture 51 in a shield plate 52, the horizontal slot 49 in the dial of the meter and then through slots 47a and 48a in the adjustable arms 47 and 48 to impinge photoelectric cells 53 and 54, respectively, to render them conductive. The photoelectric cells 53 and 54 are in circuits including a relay coil 55 or 56 and a source of current 57 or 58. Relay coil 55 actuates a double hole relay switch having separate contacts 43 and 44 while the relay coil 56 operates one contact 43a in parallel with contact 43. Relay coil 55, when energized, opens relay contact 43 and closes contact 44 and when de-energized closes contact 43 and opens contact 44. Relay coil 56 when energized opens contact 43a and when de-energized closes the contacts. Relays 43 and 43a connect the positive side of a twenty-four-volt line and the energizing gate 59 of a silicon control rectifier Q11. The silicon control rectifier Q11, in turn, is connected in series with reject lamp 45 connected across the twenty-four volt line so that when either relay 43 or 43a closes current will flow through the lamp 45. Relay 44, on the other hand, is normally closed and connects one side of the twenty-four volt line to a gate 60 of a second silicon control rectifier Q12 including a contact A7 of a stepping switch 86, later to be described. When a pulse of current is supplied to the gate of rectifier Q12 it conducts current across the twenty-four volt line through the lamp 46 to indicate that the part being tested has substantially no leaks and is being accepted.

Thus, when the needle 40 of the meter 39 is in a central position as illustrated in FIGURE 4, light beams impinge the photoelectric cells 53 and 54 to energize relay coils 55 and 56 to hold the relays 43 and 43a open and the relay 44 closed. If, after the predetermined period of the test, switch A7 closes while the relay switches 43 and 43a are open and relay switch 44 is closed a circuit is completed to fire the silicon rectifier Q12 and produce a current flow through the lamp 46 indicating that no substantial leak exists in the casting and that it is to be accepted. On the other hand, if during the period of the test the needle 40 of the meter 39 moves to the position illustrated in FIGURE 5 to cover the slot 47a in the adjustable arm 47, the needle then interrupts the beam of light to the photoelectric cell 53 to de-energize the relay winding 55 and drop the relay switch contact 43 to closed position and switch contact 44 to open position. A circuit is then completed through the relay switch 43 to pulse the gate of silicon rectifier Q11 which then fires to produce current flow through the relay lamp 45 to indicate that there is a leak in the part being tested. As switch 44 is then open a circuit cannot be completed through the accept lamp 46. If the needle 40 of the meter 39 moves in the opposite direction, or to the right, which indicates a greater pressure in the low pressure side of the chamber 27 of the measuring device 17 than in the high pressure side 28, a malfunction of the apparatus is indicated. To call this to the attention of the attendant the needle 40 would operate in the same way as previously described to interrupt the light beam to the photoelectric cell 54, de-energize the relay coil 56, drop relay switch 43a, and fire the silicon rectifier Q11 to light the reject lamp 45. If several parts are rejected in this manner it will indicate that something is wrong and call the fact of the malfunction of the apparatus to the operator's attention.

Figure 6:
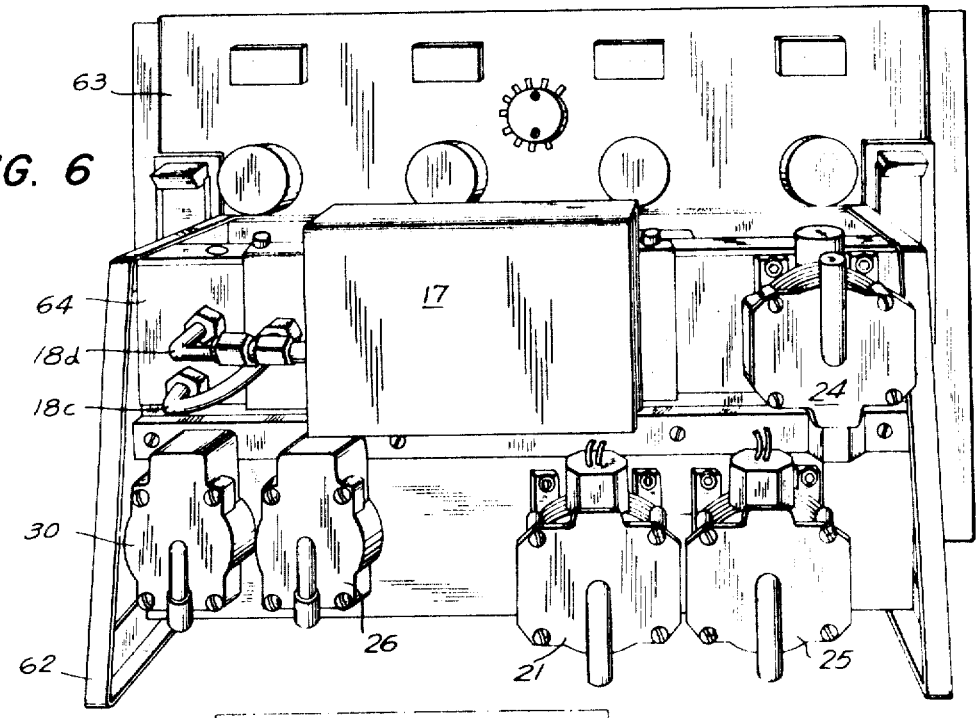
FIGURE 6 is a rear view of the testing apparatus showing the pressure sensing element and valves for the pneumatic testing circuit.

FIGURES 6 to 10 disclose the manifold 64 for connecting the various valves and other parts in a compact assembly constituting the testing instrument. FIGURE 6 illustrates the back of the instrument to show how the parts including the control valves 21, 24, 25, 26 and 30 and measuring instrument 17 are all mounted on and connected to the manifold 64 in the form of a metal block or casting. The manifold 64, in turn, is mounted on a frame 62 at the rear of a panel 63 having gauges, the meter 39 and optical unit 42 at the front thereof as well as manually operable test switches and the like. This mounting of the parts on the metal manifold 64 reduces errors resulting from temperature differences, reduces hysteresis due to the short path of the connections and reduces the time required to stabilize the parts before a test is made as well as providing a compact arrangement adjacent the part to be tested.

Figure 7:
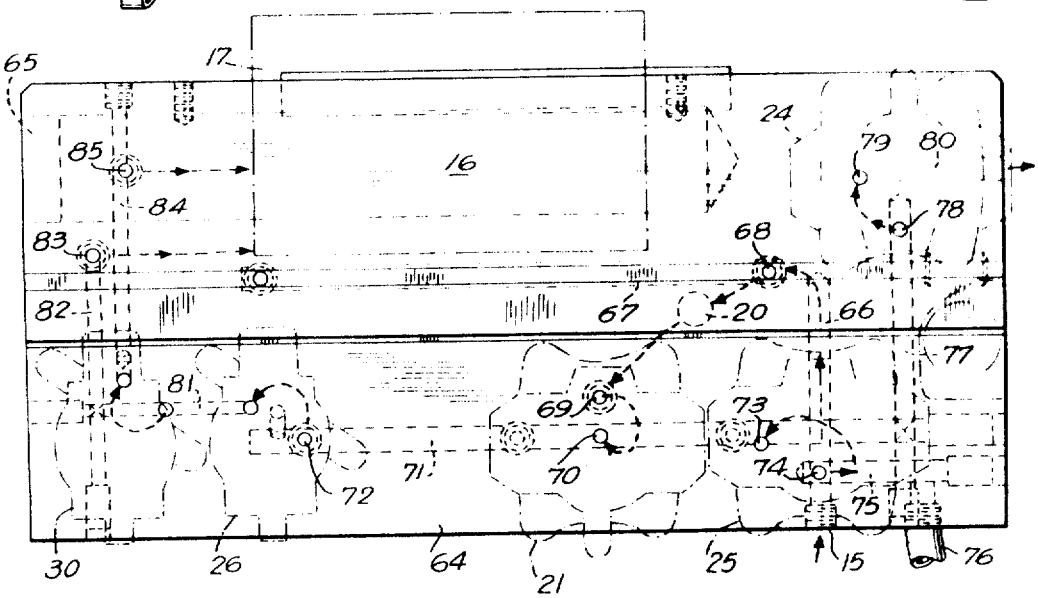
FIGURE 7 is a view similar to FIGURE 6 showing the metallic manifold block having passages therein corresponding to the lines of the pneumatic testing circuit for connection to the valves mounted thereon.
Figure 8:
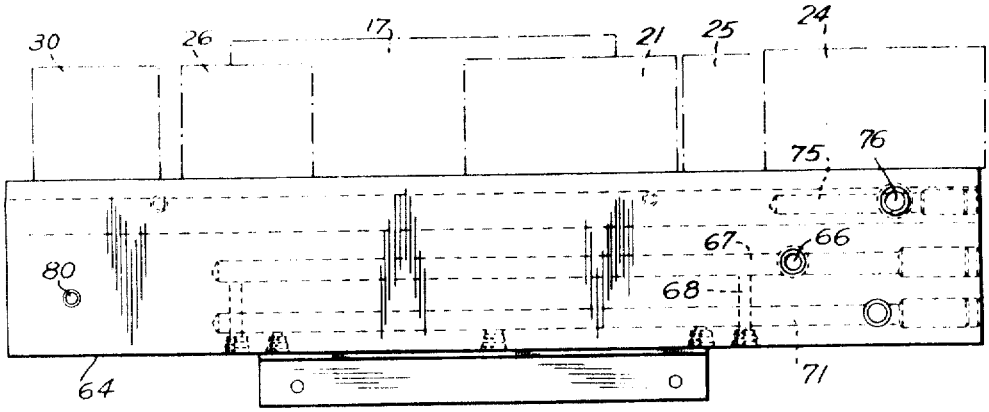
FIGURE 8 is a bottom plan view of the manifold block illustrated in FIGURE 7 to show the relation of certain of the passageways therein.

By comparing FIGURE 6 with FIGURE 2 it will be observed that the differential pressure measuring instrument 17 is positioned at the rear of the manifold 64 with the connections 18c and 18d to the opposite chambers thereof. The divide valve 30 for the differential pressure measuring device 17 is located at the lower left hand side of the figure and adjacent the divide valve 30 is the isolate valve 26. Fill valve 21 is positioned between the isolate valve 26 and the circuit test valve 25. The dump valve 24 is shown positioned above the circuit test valve 25 and to the right of the measuring instrument 17. All of these parts are bolted on to the manifold 64 and are connected to other parts through ports and passages therein. FIGURE 7 is a rear view of the block as illustrated in FIGURE 6 with the valves shown in phantom to illustrate the paths of flow of the test fluid through the manifold. FIGURE 8 is a bottom view of the manifold 64 while FIGURES 9 and 10 are end views to show the relationship of the passages with respect to each other.

Figure 9:
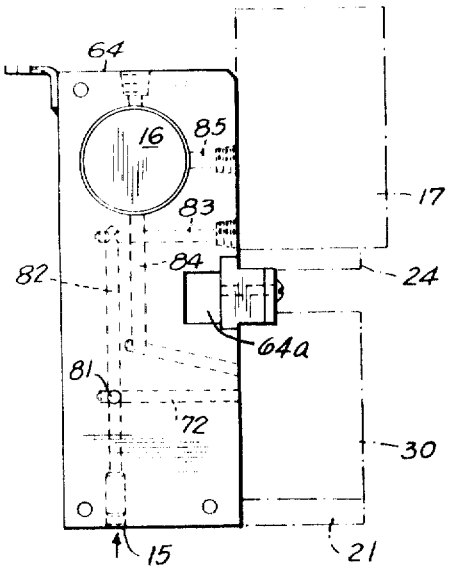
FIGURE 9 is a view of the left hand end of the manifold block illustrated in FIGURE 7 to show the relation of other of the passageways and the ballast chamber formed therein.
Figure 10:
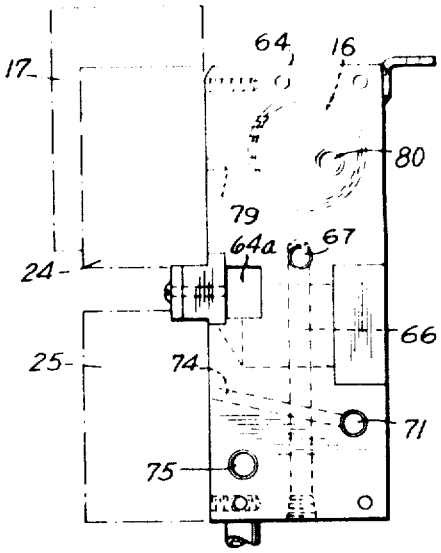
FIGURE 10 is a view of the right hand end of the metal block as viewed in FIGURE 7.

As shown most clearly in FIGURES 7, 9 and 10 the ballast tank 16 is in the form of a cylindrical cavity drilled in one end of the metal block forming manifold 64 and closed by a plug 65. Test fluid such as air under pressure from source 15 enters the block 64 through a passage 66 drilled vertically therein. The fluid then flows through a horizontal passage 67 to a port 68 at the front of manifold 64 connected to the pressure regulator 20 and then from the pressure regulator through a passage and port 69 to the rapid fill valve 21. It will be understood that each of the passages and ports referred to herein are formed by drilling holes in the block 64 and then using the holes as ports or plugging one or both ends and boring other holes into the passages so formed to provide port openings. Air under pressure flows from the fill valve through a port 70 into the horizontal passage 71 which continues to the left as viewed in FIGURE 7 and through a port 72 to the normally closed isolate valve 26. Air also flows from the fill valve 21 through the passage 71 to the right and enters the circuit test valve 25 through the port opening 73. Air flows from the circuit test valve 25 through the port 64 into passageway 75 in the manifold block 64 from which a hose 76 extends for connection to the part to be tested. Also air flows to the right in passageway 71 to the vertical passageway 77 and then through a port 78 to the dump valve 24 and from the valve through port 79 into a passage 80 connected to the atmosphere.

When the isolate valve 26 opens it permits air to flow from the left hand end of passage 71 into the passage 81 and then through the vertical passage 82 and port 83 to the low pressure chamber of the differential pressure measuring instrument. This air also flows through the normally open divide valve 30 into the vertical passage 84 and port 85 to the high pressure chamber of the measuring instrument 17 and the port 85 directly connects the high pressure chamber to the ballast tank 16. Thus, air supplied to the manifold 64 from the source 15 is controlled completely within the manifold or valves mounted on the manifold so that short passages result and a thermal conductive relation exists between the fluid in all of the chambers and passages for equalization. As the isolate valve 26 is normally closed the same air used in the test instrument 17 is maintained in the ballast cavity 16 and chambers 27 and 28, see FIGURE 3 of the test instrument, and this air is only subjected to the pressure of the testing air in the passage 71 when the isolate valve opens for a test. As will be seen by reference to FIGURES 6 to 10, a recess 64a is provided across the manifold block 64 for an electric cable to supply current to the various valves and measuring instrument.

Figure 11:
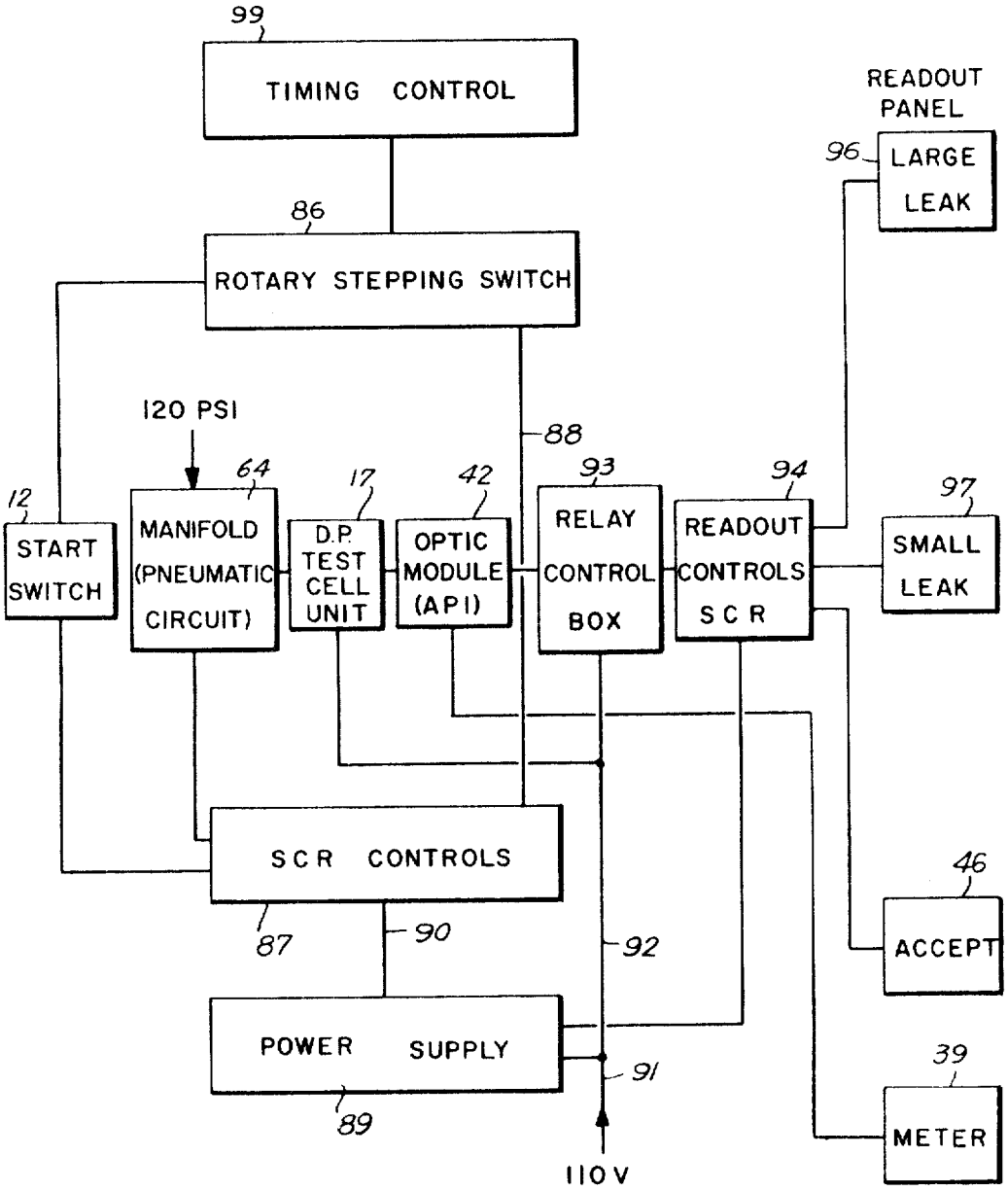
FIGURE 11 is a diagrammatic view of the various elements of the testing system and showing the interconnections therebetween.

FIGURE 11 illustrates the general arrangement and interconnection between the electrical and mechanical elements of the testing apparatus to automatically perform a testing operation. As illustrated in FIGURE 11, the starting switch 12, see FIGURE 1, operated by the last closure for sealing the engine block 2 to be tested initiates a testing operation. Switch 12 when actuated energizes a motor for indexing a rotary stepping switch 86, later to be described, for controlling the sequence and time of operation of successive testing steps. Simultaneously, the closing of switch 12 operatively connects the pneumatic controls, generally indicated by the reference character 87 in FIGURE 11, and collectively including the various solenoid operated control valves 21, 24, 25, 26 and 30 and measuring instrument 17 previously described. The stepping switch 86 and pneumatic controls 87 are electrically interconnected as indicated by line 88 in FIGURE 11 and both are supplied with electric current from a power supply pack unit 89 through the lines 90 and 88. The power pack 89 supplies D.C. current at any desired voltage, but preferably the system has been designed for direct current at twenty-four volts in certain installations. Current is supplied to the power pack unit 89 from a power line 91 at 60 cycles and 110 volts and is transformed, rectified and regulated to twenty-four volts D.C. It will be observed, however, that 60-cycle 110-volt current is supplied through the line 92 to the relay control box 93 containing the relay coils 55 and 56, see FIGURE 4, for the relays 43 and 43a.

The manifold 64 for the pneumatic circuit is automatically controlled by the rotary stepping switch 86 and pneumatic controls 87 to perform a testing operation in the test unit 17, as previously described, and the test unit is connected to the optic module 42 for controlling the relays 43, 43a and 44 in the control box 93 and actuate the circuits for the read out controls 94. It will be noted in FIGURE 11 that the optic module 42 is connected to the meter 39 previously described and that the read out controls 94 are connected to actuate the reject and accept elements 45 and 46 (lamps) shown and described in FIGURES 4 and 5. The read out controls also are connected to a large leak indicating element 96. In addition to the pneumatic controls 87 for the pneumatic circuit the system includes a timing control 99 for the rotary stepping switch.

Figure 12:
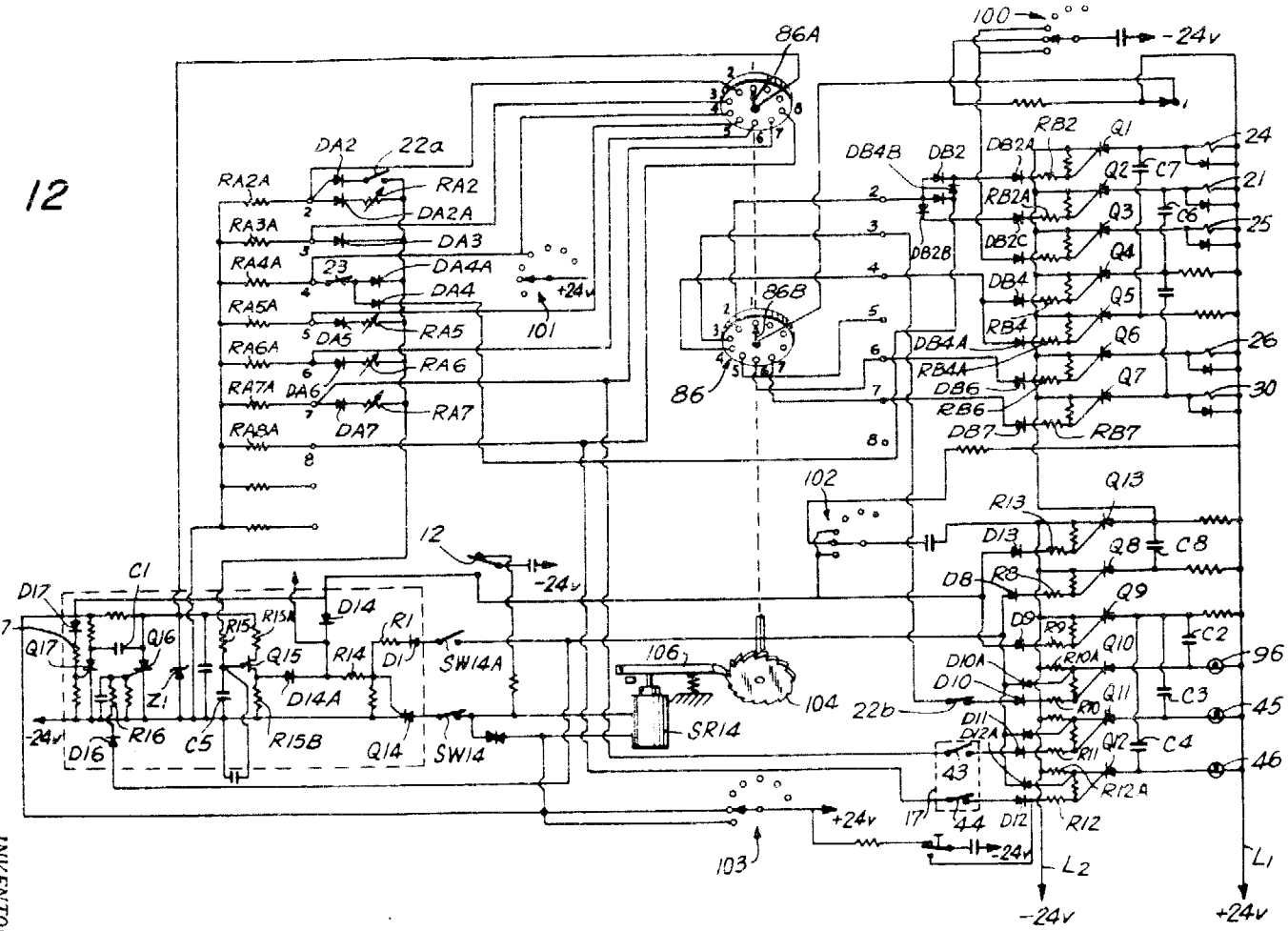
FIGURE 12 is a diagrammatic view of the electric control circuit showing the solid state control elements for automatically controlling the indexing mechanism at one side and valves at the other side to perform a testing operation automatically in successive steps.

FIGURE 12 diagrammatically illustrates an electric circuit of the present invention for automatically controlling the various elements in sequence to perform a leak testing operation and having a minimum number of mechanical switches and relays to reduce the chance of error and increase the speed of operation. In place of conventional relays the control circuit in FIGURE 12 uses silicon diodes and control rectifiers in branch circuits for the various elements with an electric time control for sequentially energizing the successive branch circuits. The various branch circuits each includes the solenoid for a particular valve 21, 24, 25, 26 and 30 and a corresponding RC network to control operation of the stepping switch and provide the required time period between successive steps of the leak testing operation. The stepping switch 86 has wiper blades 86a and 86b which are indexed to successive positions and energize successive branch circuits including the solenoids for operating the valves as well as controlling the timing and operation of the stepping switch.

The circuit will be described by the functions it per-forms so that in addition to describing the circuit it also will describe the mode of operation of the testing apparatus. Also in the description, each branch circuit at the upper left hand side of FIGURE 12, used to control the stepping switch 86, will be indicated by the reference character A, each branch circuit at the upper right hand side of FIGURE 12 for controlling the actuation of the valves will be indicated by the reference character B and the successive branch circuits closed by the stepping switch 86 will be indicated by these numbers 1 to 8. In addition, the diodes will be indicated by the reference character D, the silicon control rectifiers by the reference character Q, the electric condensers by the reference character C, the solenoid for the stepping switch as SR, switches by the reference character SW and resistors by the reference character R. In addition to the rotary stepping switch 86, four rotary switches 100, 101, 102 and 103 are shown in FIGURE 12 connected in certain of the branch circuits for testing. These four switches 100 to 103 are mounted in a gang for individual testing or connected in parallel with the stepping switch 86. Stepping switch 86 has a ratchet wheel 104 for moving wiper blades 86a and 86b to successive positions and wheel 104 is actuated by a pawl 106 connected to a solenoid SR14.

When a part 2, such as an engine block, engine head, manifold or other part having a cavity which is to be tested for leaks is brought into place and sealed, start switch 12 is closed to initiate operation of the leak test device. When switch 12 is actuated, an electric pulse will be directed through the isolating diode D14 and the series resistor R14 of 500 ohms and impressed on the gate of silicon control rectifier Q14 to cause it to fire. Firing of rectifier Q14 produces current flow through the solenoid SR14.

The same pulse flows through the isolating diode D17 and series resistor R17 of 1,000 ohms to the gate of silicon rectifier Q17 and causes it to fire. If rectifier Q16 had previously turned on, Q17 turns off Q16 through the commutating condenser C1 of 3 microfarads.

A pulse also occurs from the start switch 12 through the isolating diode D13 and the series resistor R13 of 1,000 ohms to the gate of rectifier Q13. As a result rectifier Q13 fires and conducts current from the positive side of twenty-four volt line L1 to the negative side L2 and supplies a connection to negative line L2 for the solenoid control circuitry which contains the silicon control rectifiers Q1 through Q7, the solenoids for operating control valves 24, 21, 25, 26 and 30 and other control elements.

The starting pulse also is directed through the isolating diode D9, and resistor R9 of 1,000 ohms to the gate of rectifier Q9. When the Q9 fires, it acts through the commutator condensers C2, C3 and C4 of 0.8 microfarad each connected to the anode of Q9 to turn off any indicating lamp 45, 46 or 96 that have been previously energized. As soon as SR14 becomes fully energized it opens normally-closed switch SW14 to stop current flow through rectifier Q14 or, in other words, turn off the rectifier. When SW14 opens the ratchet wheel 104 and stepping switch 86 are actuated from position No. 1 to position No. 2. In other words, the last thing that occurs after the pulsing of a branch circuit is the actuation of the stepping switch 86 to pulse the next branch.

It will be noted by reference to the lower left hand side of the circuit that a voltage regulator Z1 is provided across the line to maintain a substantially constant voltage to the stepping switch wiper blade 86a and timing circuitry controlled thereby to provide accurate repeatability.

At the No. 2 position of the stepping switch wiper 86b the twenty-four-volt D.C. current is impressed through the isolating diodes DB2 and DB2A and series resistor RB2 of 1,000 ohms to the gate of silicon rectifier Q1. As a result, Q1 fires and conducts current through the solenoid for the normally open dump valve 24 to close the dump valve. The same source of twenty-four-volt current also passes through the other diodes DB2B and DB2C and the series resistor RB2A of 1,000 ohms to the gate of rectifier Q2. Rectifier Q2 fires and energizes the solenoid of the normally-closed fill valve 21 to open the valve and fill the part 2, see FIGURES 2 and 6, with air at a pressure of, for example, 45 pounds per square inch.

During the time while the stepping switch 86 is at position No. 2, electric current at twenty-four volts passes through the isolating diode DA2 to the high pressure switch 22 with normally-open contacts, 22a, see FIGURE 2. If the high pressure contact 22a of pressure switch 22 closes it completes a circuit through the resistance R15 to the emitter of a unijunction transistor Q15. Transistor Q15 has biasing resistor R15A which limits the current to the base of the transistor. Also a discharge resistor R15B is connected between a base of the transistor and the negative side of the line. If the high pressure switch 22 does not close because the part 2 has a large leak, current flows through isolating diode DA2A and the variable timing resistor RA2 of 100,000 ohms to the emitter of the transistor Q15. Timing resistor RA2 times out at the end of the electrical time period of the RC network consisting of the 100,000 ohms resistor and the 100-microfarad condenser C5 at which time Q15 fires producing a pulse going through isolating diode D14A and series resistance R14 to the gate of rectifier Q14. The rectifier Q14 fires and energizes SR14 which causes stepping switch 86 to be indexed to its No. 3 position in both the timing sequence circuitry A and also the solenoid circuitry B. When solenoid SR14 is fully energized it opens SW14 to stop Q14 from conducting.

In position No. 3 in the solenoid circuitry B, if the normally-closed contact 22b of high pressure switch 22 fails to open because of a large leak, current flows through the isolating diode D10 and series resistor R10 of 1,000 ohms to the gate of rectifier Q10. This causes rectifier Q10 to fire and acting through condenser C2 turns off current flow through rectifier Q9. Energization of Q10 produces a current flow through the large leak lamp 96 and produces a four volt drop across the resistance R10A of 30 ohms. The four volts is then fed through the isolating diodes D10A and isolating diode D8 and resistor R8 of 100 ohms to the gate of the rectifier Q8. When rectifier Q8 fires it turns off rectifier Q13 by means of the commutator condenser C8. The turning off of rectifier Q13 opens all of the branch circuits containing rectifiers Q1 through Q7 and de-energizes all of the valves 24, 21, 25, 26 and 30. The pneumatic system then returns to the initial condition in which the fill valve 21 and isolate valve 26 are closed and the dump valve 24, circuit test valve 25 and divide valve 30 are opened and the conduit 18 is vented to atmosphere through the dump valve 24. The four volts originating from the branch circuit including Q10 then feeds through the isolating diode D1, the series resistance R1 of 100 ohms to the gate of rectifier Q14. Rectifier Q14 then fires and because the switch SW14A has closed contacts when the stepping switch 86 is in all positions except the home position, the four volts are impressed continuously on Q14 and causes the latter to fire intermittently until the stepping switch 86 reaches its home or No. 1 position when switch SW14A opens and removes the voltage from the gate of Q14.

The same four volts originating from Q10 feeds through the isolating diode D16, the series resistance R16 of 100 ohms to the gate of Q16 which fires. The firing of Q16 turns off Q17 through the 3 microfarad commutating condenser C1. The rectifier Q16 when fired causes a full IR drop to appear across the 100-ohm 10-watt resistance R17 removing the positive voltage from the wiper 86A of the stepping sequence circuit switch.

If the part 2 being tested has no leaks at all or only a small leak, the testing apparatus operates in the same way as previously described except that the contacts 22b of high pressure switch 22 open, the rectifier Q10 does not fire and the branch including indicating lamp 96 remains de-energized. The normally-open switch contact 22a of high pressure switch 22 closes in the No. 2 position to supply a twenty-four volt potential through the isolating diode DA2 to index the stepping switch 86 to position No. 3, as previously explained. The branch circuits including rectifiers Q1 and Q2 will have been actuated to open fill valve 21 and close dump valve 24.

At the instant the stepping switch 86 has moved to position No. 3, twenty-four volts is supplied through the isolating diode DA3 to the gate of the transistor Q15 causin the latter to fire. Firing of rectifier Q15 supplies a pulse through the isolating diode D14A and resistor R14 to the gate of rectifier Q14 causing the latter to fire, energizing solenoid SR14 to cause the indexing armature 106 of ratchet wheel 104 and stepping switch 86 to be actuated to the No. 4 position. In position No. 4 current flows through the isolating diode DB4 and resistor RB4 or 1,000 ohms to the gate of rectifier Q4. When rectifier Q4 fires it acts through the commutating condenser C6 of 2.8 microfarads to turn off the rectifier Q2 and close the fill valve 21. At the same instant the pulse through the isolating diode DB4A and through the resistor RB4A of 1,000 ohms is impressed on the gate of the rectifier Q5. Rectifier Q5 then fires and acting through the commutator condenser C7 of 2.8 microfarads turns off rectifier Q1 and thereby de-energizes the solenoid for dump valve 24 to open the latter and permit air to be dumped from the system. When the pressure in conduit 18 falls to some lower pressure as, for example, 35 pounds per square inch, referred to above, the low pressure switch 23 closes and supplies twenty-four volts through diode DA4 and isolating diodes DB4B and DB2A and resistance RB2 of 1,000 ohms to the gate of the rectifier Q1. This pulse causes rectifier Q1 to fire and again energize the solenoid to close the dump valve 24.

At the same time that the low pressure switch 23 closes a current flow is produced through the isolating diodes DA4A and resistance R15 to the gate of the transistor Q15 which fires as previously described and acting through isolating diodes D14A and series resistor R14 pulses the gate of rectifier Q14. Firing of rectifier Q14 again energizes the solenoid SR14 to actuate the indexing armature 106 and ratchet wheel 104 and thereby actuate the stepping switch 86 to position No. 5.

Position No. 5 corresponds to the first stabilizing position at which time twenty-four volts is supplied through the isolating diode DA5 and variable timer series resistor RA5 of 100,000 ohms. The resistor RA5 together with the condenser C5 produces an electrical time period before a voltage rise is impressed on the emitter of transistor Q15 to cause it to fire. When transistor Q15 fires it produces a pulse through the isolating diode D14A and resistor R14 to the gate of rectifier Q14 which fires as described above to energize the actuating solenoid SR14. Energization of solenoid SR14 acts through the armature 106 and ratchet wheel 104 to index the stepping switch 86 to the No. 6 position. At the No. 6 position voltage is supplied through the isolating diode DB6 and the series resistor RB6 of 1,000 ohms to the gate of the rectifier Q6. When rectifier Q6 fires, the solenoid of the normally closed isolating valve 26 is energized to open the valve and connect the test cavity with the ballast tank 16, and the high and low pressure sides of the differential pressure measuring instrument 17, see FIGURE 2.

At position No. 6 the indexing control system produces a delay in the testing operation while the isolating valve 26 is open to permit stabilization of the air pressure throughout the system. To this end, current at twenty-four volts is supplied through the isolating diode DA6 and the 100,000 ohms variable timing resistance RA6 to the emitter of the transistor Q15. The predetermined time before transistor 15 again fires is governed by the electrical time period of the RC network, and it will be noted that the timing is dependent upon the setting of the variable timing resistor RA6 and 100-microfarad condenser C5. After some predetermined network timing as, for example, 5 seconds, Q15 fires and supplies a pulse through the isolating diode D14A, the series resistance R14 to the gate of rectifier Q14. Again, rectifier Q14 fires energizing solenoid SR14, and when the latter is fully energized, opens switch SW14 which, in turn, turns off Q14. Energization of solenoid SR14 causes stepping switch 86 to be actuated to position No. 7.

At position No. 7 the actual measuring operation is performed to determine if any difference in pressure occurs in the differential pressure measuring device 17 during a fixed period of time. Stepping switch wiper 86b supplies twenty-four volts through the isolating diode DB7 and series resistance RB7 of 1,000 ohms to the gate of rectifier Q7. This causes rectifier Q7 to fire and energizes the solenoid for closing of the divide valve 30 to initiate the test. It will be recalled that the divide valve 30 isolates the reference cavity chamber 16 in the manifold 64, see FIGURES 1 and 7, and chamber 28 of the measuring instrument 17 from the cavity in the part 2 to be tested. At position No. 7 a voltage is supplied to the timing circuit through isolating diode DA7 and the variable resistor RA7 of the timing resistance of 100,000 ohms.

If the part being tested does have a small leak, the low pressure switch 43 of the measuring instrument 17 closes and switch 44 of the measuring instrument opens. Thus, a pulse is delivered from contact A7 of stepping switch 86A through the diode D11 and resistance R11 to the gate of rectifier Q11 to cause it to fire. When rectifier Q11 fires it lights the lamp 45 indicating a small leak and otherwise operates in the same way as described above with respect to Q10. The branch circuit for Q12, of course, is maintained open by the open switch 44.

If there is no small leak and low pressure switch 22b does not open for the predetermined time established by the setting of the resistor RA7 in series with the resistor 15 and condenser C5 of 100 microfarads, the transistor Q15 fires. This period is generally about 10 seconds, but it is within the scope of the present invention to vary the time from 5 to 15 seconds. When rectifier Q15 fires a pulse is directed through the isolating diode D14A and series resistor R14 to the gate of rectifier Q14. Pulsing of rectifier Q14 causes it to fire and energize solenoid SR14 and operate stepping switch 86 to position No. 8.

If no leak exists, twenty-four volts are supplied through the normally-closed relay contact 44 and contact A8 of the stepping switch 86A, see FIGURE 4, to the isolating diode D12, see FIGURE 12, the series resistance R12 of 1,000 ohms to the gate of rectifier Q12. When rectifier Q12 fires it turns off rectifier Q9 through the commutating condenser C4 of 0.8 microfarad. The lamp 46 is energized and four volts are produced across the series resistor R12A of 30 ohms. This four volts through the isolating diode D12A are impressed on the gate of rectifier Q8 by the connection through the isolating diode D8 and series resistor R8 of 100 ohms. Pulsing the gate of rectifier Q8 causes it to fire. Firing of rectifier Q8 turns off rectifier Q13 through the commutator condenser C8 of 2.8 microfarads. Opening of the circuit through the rectifier Q13 opens all of the solenoid branch circuits to the negative side of the D.C. voltage line. This same four-volt potential also is supplied through the branch including rectifier Q12 to the closed switch SW14A. Thus, a four-volt potential is fed through the isolating diode D1 and series resistor R1 to the gate of rectifier Q14 which continues to fire in successive steps to index the stepping switch 86 to its home or No. 1 position at which time the contacts of switch SW14A are opened. The same four-volt potential also is supplied through the isolating diode D16 and series resistor R16 of 100 ohms to the gate of rectifier Q16. Rectifier Q16 fires and through the commutator condenser C1 turns off Q17. This produces a full IR drop across the 100-ohm 10-watt resistor R17 to remove the positive voltage to the step switch wiper 86b and timing circuit. Thus, it is observed that when the relay contact 44 is closed the accept lamp 46 is on to indicate that the part has substantially no leaks.

A series of resistors RA2A to RA8A are provided in series in the stepping control circuits to supply an artificial current drain across the contacts to prevent "dry" circuitry.

The four manually operated test switches 100 to 103 are connected to energize different branch circuits of the control system independently of the stepping switch 86. By manually setting the gang switch to a particular position, an individual switch 100 to 103 may be set to connect a particular branch circuit to a source of current to determine whether that circuit is operative. In other words, the testing apparatus may be cycled manually, at least in part, by means of the switches 100 to 103 as well as automatically by the stepping switch 86.

It will now be observed that the present invention provides an improved method of and apparatus for testing parts for leaks which is extremely sensitive in detecting leaks and quickly responsive to indicate that a leak exists. It will also be observed that the present invention provides an improved method and apparatus for testing parts for leaks which operates with a high degree of reliability to indicate automatically at high speed that the part has no leaks, or has a large leak or a small leak. It will also be observed that the apparatus of the present invention has a minimum of mechanically moving parts such as relays and valves. It will still further be observed that the present invention provides an apparatus of the type indicated which is of simple and compact construction, economical to manufacture, reliable in operation and one which is easy to service and repair.

While a single embodiment of the invention is herein illustrated and described, it will be understood that changes may be made in the construction and arrangement of parts without departing from the spirit or scope of the invention. Therefore, without limitation in this respect the invention is defined by the following claims.

What is claimed:

1. A method of testing parts for leaks which comprises the steps of subjecting the opposite sides of a wall of a part to be tested to a difference in pressure, forming a closed chamber on at least one side of said wall, connecting said chamber to a standard chamber, segregating the two chambers after the pressure therein is equalized, measuring any difference in pressure in the two chambers during a predetermined period of time, producing a voltage directly proportional to any measured difference in pressure, utilizing any voltage so produced to actuate a responsive device to indicate the occurrence of a leak, [subsequentially] *sequentially* performing the steps of forming the closed chamber, segregating the two chambers and measuring any difference in pressure by successive RC networks each having a predetermined time period, and energizing the successive networks by operation of the preceding network whereby to automatically perform a testing operation by forces produced by each successive step.

2. A method of testing parts for leaks in accordance with claim 1 in which any variation in voltage is measured by a meter to indicate a leak and the size of the leak, and using the deflection of the movable element of the meter to operate the electric responsive device to reject the part.

3. A method of testing parts for leaks in accordance with claim 2 in which a silicon control rectifier is utilized to energize the electric responsive device, and the deflection of the movable element of the meter controls the supply of an electric pulse to the rectifier.

4. A method of testing parts for leaks in accordance with claim 1 in which a testing fluid is supplied to said chamber in said part to be tested, and using a lack of pressure in said chamber during a predetermined period of time to operate the electric responsive device to reject the part.

5. A method of testing parts for leaks in accordance with claim 1 in which a testing fluid is supplied to said chamber in the part to be tested at a pressure above the testing pressure, discharging fluid from said chamber until a predetermined lower pressure is attained at which the test is to be made, connecting the standard chamber to the chamber in the part after the lower pressure has been reached, and sequentially performing said steps of supplying high pressure testing fluid to the chamber, reducing the pressure to the lower testing pressure, connecting the separate chambers to produce a uniform pressure, and then segregating the chambers to measure any difference in pressure that may occur.

6. Apparatus for testing parts for leaks comprising movable closure means for forming a sealed chamber in the part, a measuring instrument having separate chambers with a movable diaphragm therebetween, a source of fluid under pressure, conduit means connecting said source of fluid under pressure to the chamber in the part being tested and separate chambers of the measuring instrument, valves in the conduit means for controlling the flow of fluid in the conduit means to the chamber in the part being tested and chambers of the measuring instrument and for dividing the chambers of the measuring instrument from each other, said conduit means being in the form of passages in a metal manifold and having ports for connection to the valves and chambers in the measuring instrument, a transducer for producing a variation in voltage directly proportional to variations in the difference in pressure at opposite sides of the diaphragm in the measuring instrument, a meter operated by the transducer for indicating any leak producing a difference in pressure in the separate chambers of the measuring instrument, an optical unit in an electric circuit controlled by the meter and energizing a responsive element when a leak exists, said electric control circuit having an RC network for controlling the period of time during which the optical unit is operative to energize the responsive element, and a silicon control rectifier fired by an electric pulse produced by the optical unit to energize the responsive element.

7. Apparatus for testing parts for leaks comprising movable closure means for forming a sealed chamber in the part, a measuring instrument having separate chambers with a movable diaphragm therebetween, a source of fluid under pressure, conduit means connecting said source of fluid under pressure to the chamber in the part being tested and separate chambers of the measuring instrument, valves in the conduit means for controlling the flow of fluid in the conduit means to the chamber in the part being tested and chambers of the measuring instrument and for dividing the chambers of the measuring instrument from each other, a transducer for producing a variation in voltage directly proportional to variations in the difference in pressure acting on opposite sides of the diaphragm in the measuring instrument, a meter operated by the transducer for indicating any leak producing a difference in pressures in the separate chambers of the measuring instrument, an optical unit in an electric circuit controlled by the meter and energizing a responsive element when a leak exists, said electric control circuit having an RC network for controlling the period of time during which the optical unit is operative to energize the responsive element, and a silicon control rectifier fired by the optical unit to energize the responsive element.

8. Apparatus for testing parts for leaks comprising movable closure means for forming a sealed chamber in the part to be tested, a measuring instrument having separate chambers with a movable diaphragm therebetween, means responsive to movemnet of the diaphragm for indicating a leak, a source of fluid under pressure, conduit means for connecting said source of pressure to the chamber in the part to be tested and the chambers of the measuring instrument, valves for controlling the flow of fluid from said source to the chambers in the part being tested and measuring instrument and from one chamber of the instrument to the other chamber thereof, said conduit means being in the form of a plurality of passages in a metal manifold block and having ports for connection to the valve means and chamber in the part to be tested and chamber in the measuring instrument, all of the fluid flowing to the chamber in the part being tested and chambers in the measuring instrument passing through some one of the passages in the metal manifold block in heat exchange relation with fluid in the other passages by conduction through the metal block, an electric control circuit for controlling operation of the valves in a predetermined sequence, and said electric control circuit having an RC network for controlling the operation of the valves to produce a predetermined period of time during which the measuring instrument is operative to indicate a leak.

9. Apparatus for testing parts for leaks comprising movable closure means for forming a sealed chamber in the part, a source of fluid under pressure, a measuring instrument having separate chambers with a movable diaphragm therebetween, conduit means connecting said source of fluid under pressure to the chamber in the part being tested and separate chambers of the measuring instrument, valves in said conduit means for controlling the connections between the chamber in the part being tested and one of the chambers of the testing element and for closing the other chamber of the testing element from communication therewith, means responsive to movement of the diaphragm resulting from a difference in pressure in the chambers of the measuring instrument for indicating a leak in the part being tested, said conduit means being in the form of a plurality of passages in a metal manifold block and having ports for connection to the valves and chambers in the measuring instrument and part being tested, said valves and measuring instrument being mounted on said metal block, and said passages being in heat exchange relation by conduction through the metal block to maintain the fluid in the different passages at a substantially uniform temperature.

10. Apparatus for testing parts for leaks comprising movable closure means for subjecting the opposite sides of the wall of a part to be tested to a difference in pressure and forming a sealed chamber on at least one side of the part, a measuring instrument for indicating a difference in pressure and having separate chambers with a movable diaphragm therebetween, a source of fluid under pressure, conduit means connecting said source of fluid under pressure to the chamber in the part being tested and the separate chambers of the measuring instrument, a fill valve in the conduit for controlling flow of fluid from said source to the chamber in the part being tested and chambers in the measuring instrument, a divide valve in the conduit means between the chambers of the measuring instrument for separating one of the chambers from the other to initiate a leak test, said other chamber being in communication with the chamber in the part being tested, an electric circuit comprising an electric responsive element for indicating a leak, a series of RC branch networks each having a predetermined time period, a series of responsive branch circuits with certain of the responsive branch circuits having means to operate the fill valve, the divide valve and electric responsive element for indicating a leak, respectively, means in the circuit including a switch for energizing the first RC network and first responsive branch of the series to operate the fill valve, and means controlled by each RC branch network at the end of its time period to energize the next RC branch network of the series and connect a particular responsive branch for energization to successively operate the divide valve and electric responsive element for indicating a leak as controlled by the measuring instrument.

11. Apparatus for testing parts for leaks in accordance with claim 10 in which the electric circuit comprises a stepping switch for energizing said branch circuits successively, a responsive element operated by energization of each of said branch circuits, successively, and connected to index the stepping switch, and the RC network in one of said branch circuits for controlling operation of the divide valve having a condenser and variable resistance for varying the electrical time period of the network.

12. Apparatus for testing parts for leaks in accordance with claim 10 in which the electric circuit comprises a stepping switch for energizing said responsive branch circuits successively to open the fill valve and close the divide valve, and means operated by the stepping switch for indexing it to successive positions.

13. Apparatus for testing parts for leaks in accordance with claim 10 in which the electric circuit comprises a silicon control rectifier in each of said responsive branch circuits, and means for impressing an electric pulse on the gate of said rectifiers to energize the branch circuits successively.

14. Apparatus for testing parts for leaks in accordance with claim 10 including in addition to the fill valve and divide valve, a dump valve for discharging fluid from the conduit means to the atmosphere, an isolate valve for isolating the separate chambers of the measuring instrument from the remainder of the testing apparatus, said dump valve and isolate valve each being connected in one of the responsive branches of the electric circuit, a stepping switch for energizing said series of RC branch networks successively, a responsive element actuated by energization of each of said branch circuits and connected to index the stepping switch, silicon control rectifiers in said responsive circuit branches having responsive elements, and means controlled by the stepping switch for impressing an electric pulse on the gate of said rectifiers to energize the responsive branch circuits successively.

15. Apparatus for testing parts for leaks in accordance with claim 10 in which the means controlled by the measuring instrument is a transducer for producing a voltage directly proportional to the difference in pressure at opposite sides of the diaphragm, and means operable in response to the voltage produced by the difference in pressure for initiating a responsive element for controlling energization of the responsive branch having the element for indicating a leak.

16. Apparatus for testing parts for leaks in accordance with claim 15 in which the responsive element is a meter, and an optical relay unit controlled by the meter energizing the element for indicating a leak.

17. Apparatus for testing parts for leaks in accordance with claim 10 in which the various conduit connections between the source of fluid under pressure and the chambers and valves are formed as passages in a metal manifold block.

18. Apparatus for testing parts for leaks in accordance with claim 17 in which a chamber is formed in the metal mainfold block and connected by a passageway therein to one of the chambers of the measuring instrument.

19. Apparatus for testing parts for leaks comprising movable closure means for subjecting the opposite sides of the wall of a part to be tested to a difference in pressure and forming a sealed chamber on at least one side of the part, a measuring instrument for indicating a difference in pressure and having separate chambers with a movable diaphragm therebetween, a source of fluid under pressure, conduit means connecting the source of pressure to the chamber in the part being tested and the separate chambers of the measuring instrument, a fill valve in the conduit for controlling flow of fluid from said source to the chamber in the part being tested and chambers in the measuring instrument, a divide valve in the conduit means between the chambers of the measuring instrument for separating one of the chambers from the other to initiate a leak test, said other chamber being in communication with the chamber in the part being tested, an electric circuit for operating the divide valve and having an RC network for maintaining said valve closed for the predetermined period of the test, a plurality of parallel branches in the circuit having responsive elements, a silicon control rectifier in each of said branches, and means for impressing an electric pulse on the gate of said rectifiers to energize the branch circuits, successively.

20. Apparatus for testing parts for leaks comprising movable closure means for subjecting the opposite sides of the wall of a part to be tested to a difference in pressure and forming a sealed chamber on at least one side of the part, a measuring instrument for indicating a difference in pressure and having separate chambers with a movable diaphragm therebetween, a source of fluid under pressure, conduit means connecting the source of fluid under pressure to the chamber in the part being tested and the separate chambers of the measuring instrument, a fill valve in the conduit for controlling flow of fluid from said source to the chamber in the part being tested and chambers in the measuring instrument, a divide valve in the conduit means between the chambers of the measuring instrument for separating one of the chambers from the other to initiate a leak test, said other chamber being in communication with the chamber in the part being tested, an electric circuit for operating the divide valve and having an RC network for maintaining said valve closed for the predetermined period of the test, a transducer controlled by the measuring instrument to produce a voltage proportional to any leak in the part being tested, a branch circuit having means for indicating a leak and a silicon control rectifier, and means operated by a voltage produced by the tranducer for impressing an electric pulse on the gate of satid rectifier to energize the branch circuit to indicate a leak.

References Cited

The following references, cited by the Examiner, are of record in the patented file of this patent or the original patent.

UNITED STATES PATENTS

| | | |
|---|---|---|
| 2,924,965 | 2/1960 | Westerheim. |
| 2,936,611 | 5/1960 | Le Mat et al. |
| 3,028,750 | 4/1962 | Rondeau. |
| 3,031,884 | 5/1962 | Martin. |
| 3,091,958 | 6/1963 | Robins |
| 3,221,539 | 12/1965 | Evans et al. |

S. CLEMENT SWISHER, Primary Examiner